Patented Dec. 12, 1933

1,939,166

UNITED STATES PATENT OFFICE 1,939,166

TREATMENT OF INTESTINAL TRACT

Lazarus G. Hadjopoulos, New York, N. Y., assignor to Monsanto Chemical Company, St. Louis, Mo., a corporation of Delaware No Drawing. Application July 21, 1930
Serial No. 469,642

4 Claims. (Cl. 167—55)

The present invention relates to a novel therapeutical treatment for the human digestive tract and particularly the small intestines thereof for the purpose of correcting undesirable and abnormal bacteriological and germinal manifestations.

The principal object of the invention is to provide a new method of treating intestinal disorders including colitis, enterocolitis, gastric and duodenal ulcers, intestinal toxemias, summer diarrhoeas, etc.

A further object of the invention is to provide a novel class of soaplike chemical compositions having valuable therapeutical properties. These together with other objects will become more apparent from a consideration of the description of my invention hereinafter set forth.

Although the cleansing property of soaps has been recognized for a great number of years, their germicidal and bacteriological properties have been observed only comparatively recently. However, except in instances of mouth washes, dentifrices and enema administrations, no use has been made of the therapeutic property of soap in internal medicine.

I have discovered that soaps are excellent pharmaceuticals for the internal treatment of the lower digestive tract and particularly the small intestines thereof.

My investigations have disclosed that while soaps generally are valuable for the purposes herein set forth, distinctly superior results are afforded by soaps and soap-like compositions which are the reaction products of a base and phosphorus-nitrogen containing organic material commonly designated as aminophosphatids or phospholipins. To the best of my knowledge these soap-like compositions have not been prepared heretofore.

In general the preparation of these novel compositions is analogous to that involved in the preparation of any soap and consists in reacting a basic material with an acid, in this case the aminophosphatids. For this purpose a large variety of aminophosphatids (perhaps more commonly designated lecithids or lipoids) may be employed. These materials are available on the market and are termed variously according to their source: ovolecithid being obtained from the yolk of egg, cephalin from the brain, sphyngomyelin from the nerve tissues, carnaubon from the kidney tissues, etc. These materials are closely allied to neutral fats, but differ therefrom in that they have incorporated in their molecule the elements of nitrogen and phosphorus, the former in the choline, the latter in a phosphoric acid combination. Depending upon the proportion of nitrogen and phosphorus present in the molecule they are termed monoaminophosphatids, diaminophosphatids, diaminodiphosphatids, etc. A structural formula which has been ascribed to egg lecithid follows:

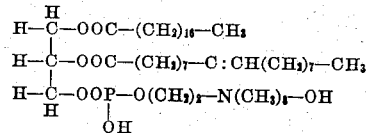

To prepare a lipoid soap one may mix 100 grams of lecithin in sufficient alcohol to effect dissolution. The dissolution may be facilitated by heating, thereafter 15–20 cc's of 40% sodium hydroxide are added and the mixture is boiled to ensure complete saponification. After the saponification is completed, the excess alkali is removed by adding acetic acid to produce only slight alkalinity. The soap so produced is dissolved in 50 cc's of hot water, after which enough sodium chloride is added, approximately 100 grams usually being sufficient, to salt out the soap. A few drops of an alcoholic solution of phenolphthalin may be added to prevent any tendency to foam. A pure soap is thus produced which will float on the surface of the water and which will have a faint pink colorization indicating the proper degree of alkalinity. Upon cooling, the product is washed free of salt with ice cold water and thereafter dried. Soaps of other lipoids may be prepared in an analogous manner. The exact structural formula of these soap-like bodies has not been established. However, tests indicate that soaps prepared from lipoids are well adapted for use as medicaments in internal therapy.

When the product is to be employed as a medicament and for the purpose of facilitating its dispersion in the stomach, one may mix the dry soap with a sugar such as milk sugar (lactose) after which it may be stored conveniently in a cool, dark place.

While soaps evidence a slight laxative property when taken internally, it is not uncommon for them to produce a slight griping and in a small percentage of cases moderate constipation. To overcome this one may incorporate, by trituration, a small quantity of a laxative, such as phenolphthalein. The resulting product can be administered orally, preferably in a gelatine capsule. A 10 grain capsule containing the following ratio of ingredients has given highly satisfactory results:

|  | Grains |
|---|---|
| Lecithid soaps | 3 |
| Phenolphthalein | 2 |
| Lactose | 5 |

If desired, of course, one may substitute in part, any one or a mixture of the well known soap compositions. Similarly one may incorporate additional intestinal antiseptics such as salol.

The soap compositions hereinabove set forth are effective as germicides, particularly the forms of disease caused by excessive growth of certain strains of pathogenic streptococci in the intestines, such as summer diarrhoeas, colitis, enterocolitis, gastric and duodenal ulcers, intestinal toxemias, etc. They are likewise useful as mild laxatives for chronic constipation. Inasmuch as the most common cases of constipation are probably caused by the growth of stretococcic flora of the intestines, the medicaments herein are particularly valuable since they strike at the cause as well as the condition.

The precise action of the soaps in the intestines is not clearly understood. It is quite probable, however, that the soaps pass through the stomach into the intestines in an unchanged condition. Upon entering the intestines they probably perform at least two important functions, first, in that they reduce surface tension of the fluid contents therein and thereby exert a profound effect on the intestinal bacteria which is essentially streptococcic and secondly, by reason of their germicidal properties, together with the reduction of surface tension they render the surface of the intestines inimical to the further growth and spread of undesirable germs. It is to be understood, of course, that the above theory is offered by way of explanation only and that the invention is not limited by the correctness thereof.

Although I have described various embodiments of the present invention both as to the manner of producing the medicaments, as well as their administration for the treatment of various germinal and bacteriological conditions of the lower digestive tract, it is to be understood that the invention is not limited to the examples set forth, but rather contemplates broadly the use of water soluble or emulsifiable soaps and soap-like compositions of the lecithid type as an oral medicament for the treatment of intestinal ailments, and further that for this purpose the acid radical of such soap or soap-like compositions may contain substituted groups, whereas the base radical may be of an alkali or alkaline earth specie or of an organic base specie such as triethanolamine.

What I claim is:

1. A medicament for the therapeutic treatment of the intestinal tract adapted for oral administration embodying a soap produced by reacting a base with a lipoid.

2. A medicament for the therapeutic treatment of the intestinal tract adapted for oral administration embodying a lecithid soap.

3. A medicament for the therapeutic treatment of the intestinal tract adapted for oral administration embodying a lecithin soap.

4. A medicament for the therapeutic treatment of the intestinal tract adapted for oral administration embodying a lecithid soap of the alkali metal sodium.

LAZARUS G. HADJOPOULOS.